Sept. 10, 1963   A. BECHLER   3,103,146
AUTOMATIC LATHE
Filed Dec. 21, 1959   4 Sheets-Sheet 1
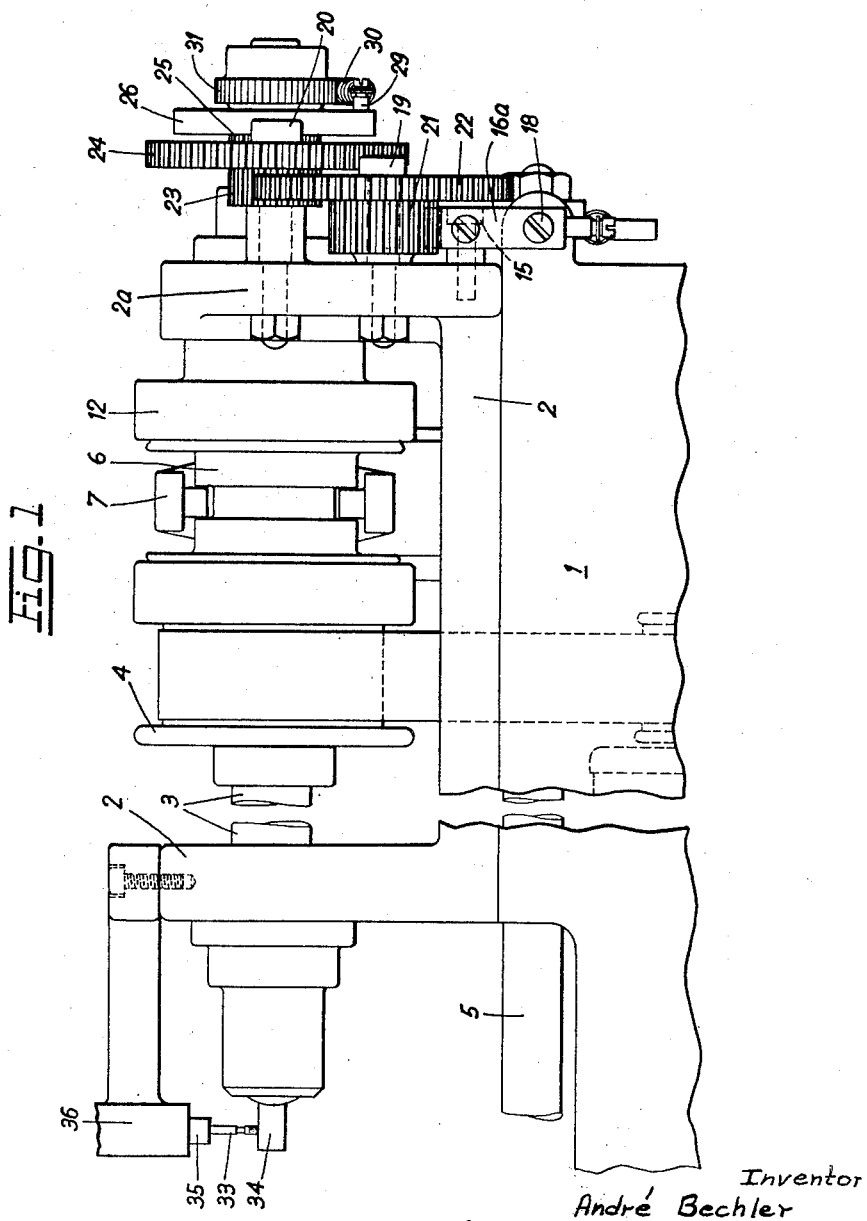
Inventor
André Bechler
By Stevens, Davis, Miller & Mosher
Attorneys

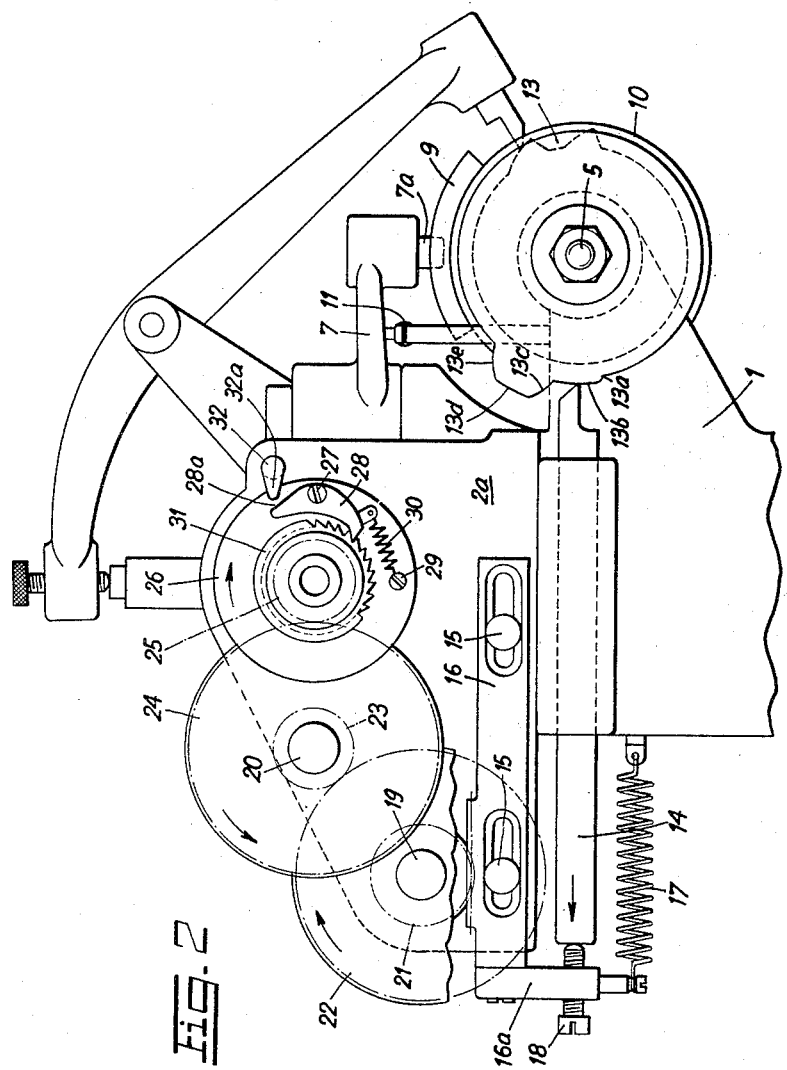

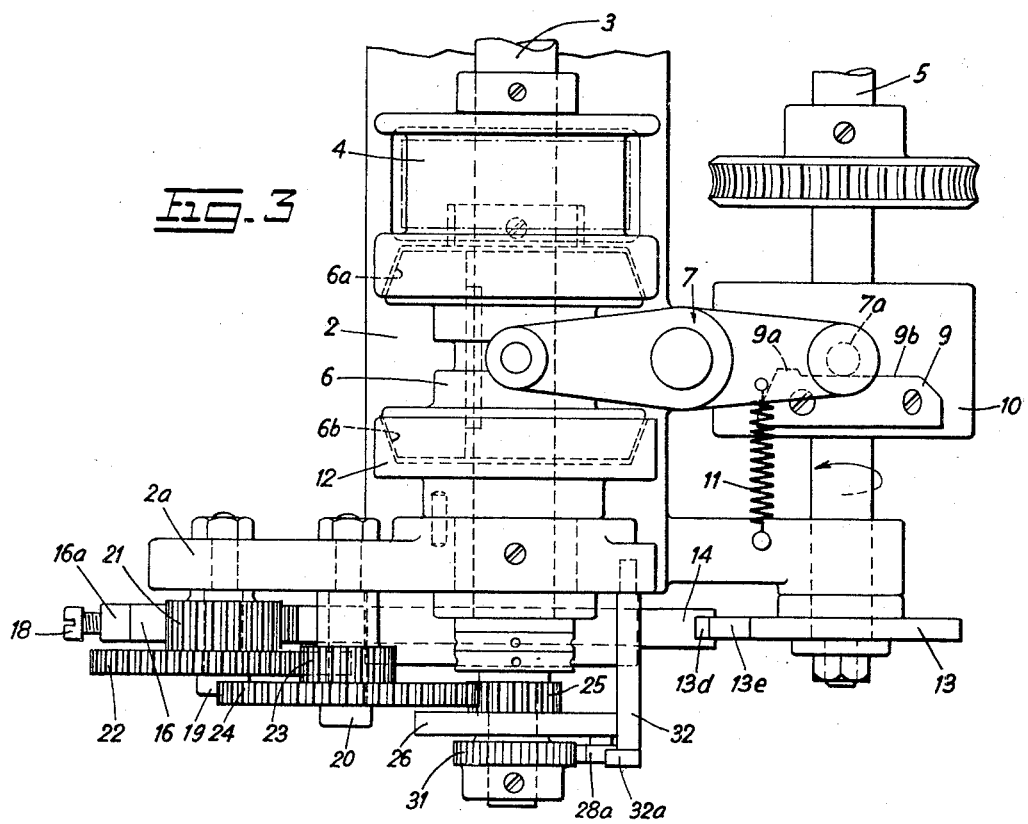

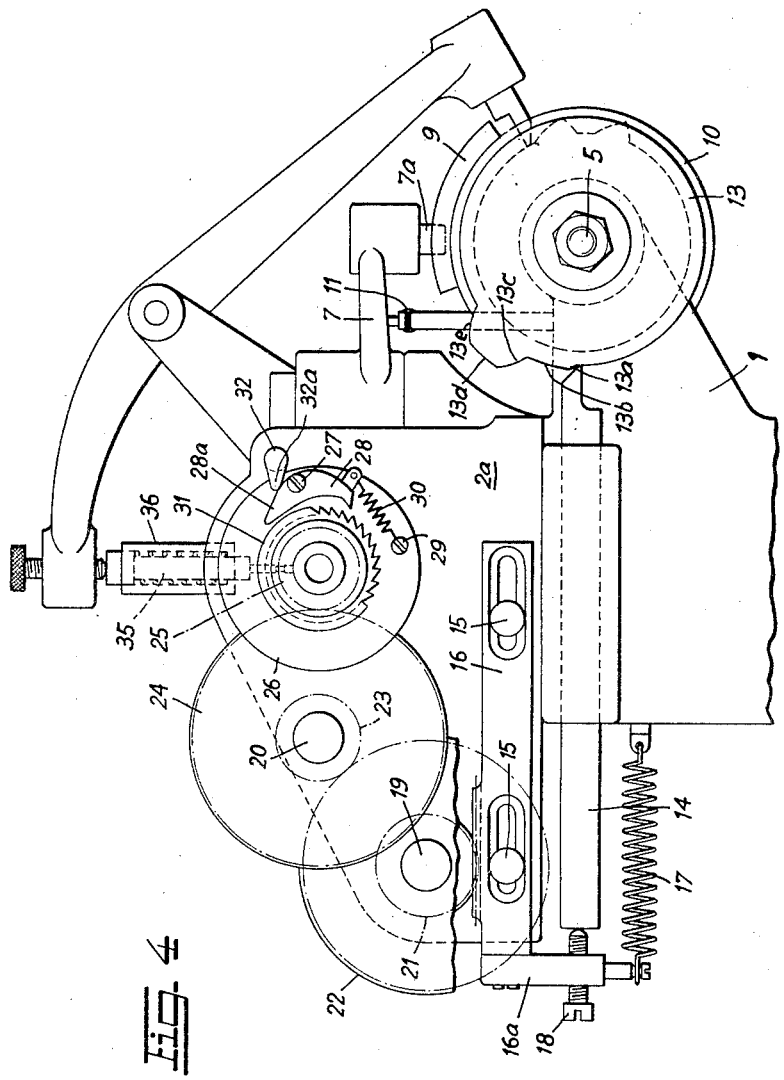

3,103,146
AUTOMATIC LATHE
André Bechler, 4 Rue Centrale, Moutier, Switzerland
Filed Dec. 21, 1959, Ser. No. 861,065
Claims priority, application Switzerland Mar. 26, 1959
6 Claims. (Cl. 90—15.1)

My present invention relates to improvements in automatic lathes comprising a continuously rotating control shaft and an arrangement for driving the work-carrying spindle.

The principal object of the invention is to render automatic lathes usable for carrying out machining operations which require the work to be turned once or repeatedly through certain angles. It may be required, for example, to provide a drill or cutter which stands at right angles to the work-carrying spindle and which enables the lathe to provide the workpiece with holes, curved and straight grooves, flats and the like without having to reclamp the workpiece.

The arrangement disclosed by the invention is characterized by means actuated by control-shaft cams for temporarily slowing down the work-carrying spindle normally coupled to a motor drive, and by an attachment operated by an additional control-shaft cam for subsequently turning the work-carrying spindle through an angle of less than 360°.

The drawing shows, by way of example, one form of the invention.

FIG. 1 shows elevation,
FIG. 2 illustrates an end view,
FIG. 3 is a top plan view, and
FIG. 4 is an end view similar to FIG. 2 but further illustrating the details of a tool attachment.

Numeral 1 denotes the bed of an automatic lathe, 2 a headstock and 3 a work-carrying spindle mounted in the headstock. On spindle 3 is mounted a pulley 4 loosely rotatable but axially immovable which, as well as a control shaft 5 rotatably mounted in cantilevers of bed 1 is in conventional driving connection with a motor drive mechanism.

To spindle 3 is connected, in a non-rotatable but axially movable relation, the driven member 6 of a throwover friction clutch which comprises two friction cones 6a, 6b and is actuated by means of a change lever 7 pivoted to headstock 2. A pin 7a of lever 7 is biased at certain times by a cam 9 which is secured to a drum 10 fixed to the control shaft 5. During the greater portion of the lathe working cycle, which corresponds to one revolution of shaft 5, lever 7 is biased by a spring 11 so that it couples member 6 to pulley 4, whereby spindle 3 is driven conventionally and counterclockwise (FIG. 2). As long as cam 9 through its boss 9a biases pin 7a of reversing lever 7, member 6 is urged against a counter-cone of a fixed structural part 12, whereby spindle 3 is slowed down and stopped. Lever 7 and, thereby, a clutch member 6 are temporarily retained in the neutral intermediate position by the holding face 9b of cam 9, as shown in FIG. 3. Spindle 3 then is released, i.e. neither driven nor braked.

An attachment, presently to be described, is provided which in this portion of the working cycle effects one or more rotary motions of work spindle 3 through angles of less than 360°. To shaft 5 is fixed an additional cam disc 13. A cross-wise disposed ram 14 is guided longitudinally movable in a guide provided on bed 1. In a plate 2a integral with headstock 2 are screwed two bolts 15 on which a rack 16 is movably guided in the same direction as ram 14. A lug 16a secured to the rear end of rack 16 is acted on by a spring 17. Under the action of the latter, a screw 18 adjustable in lug 16a is urged against the rear end of ram 14, and the forward end of the latter is pressed against cam disc 13. On two axle pins 19, 20 secured to plate 2a are rotatably mounted members of a back gear assembly. The movements of rack 16 are transmitted via a pinion 21, a gear 22, a pinion 23 and a further gear 24 of said assembly to a gear 25 which, together with a pawl-carrying disc 26 secured thereto for rotation, is mounted loosely rotatable on work spindle 3. On an axle screw 27 secured to disc 26 is pivoted a pawl 28. To another screw 29 secured to disc 26 is anchored one end of a tension spring 30 of which the other end biases pawl 28 to hold it in engagement with a ratchet wheel 31 fixed to work spindle 3. As long as, however, ram 14 and rack 16 occupy their outermost right-hand position in FIG. 2, pawl-carrying disc 26 is turned backwards so far that pawl 28 with its arm 28a abuts against the lug 32a of a pin 32 secured to plate 2a and its tip is disengaged from ratchet wheel 31. This is the case, in particular, as long as work spindle 3 is coupled to pulley 4.

On the circumference of cam disc 13 are provided a first or low step 13a, a first dwell 13b coaxial with the control shaft, a second or high step 13c, a second dwell 13d coaxial with the control shaft, and a slope 13e. Step 13a effects a rotation of disc 26 to an extent sufficient to disengage pawl arm 28a from lug 32a and to let pawl 28, after the latter's full engagement to ratchet wheel 31, turn the latter and thereby spindle 3 through a small angle. When dwell 13b is moving past ram 14, the latter and thus the parts 16 to 18 and 21 to 31 and spindle 3 stand still. During this period of standstill a radial hole for example may be made by means of a drill or cutter 33 in a workpiece 34 clamped to work spindle 3. Tool 33 is fed and returned by means of another cam of the control shaft, as is conventional in automatic lathes for other tools. After said tool has been returned, ram 14 is biased by high step 13c of cam disc 13, spindle 3 thereby being turned by means of the parts 16 to 18 and 21 to 31 through an angle corresponding to the height of step 13c. When dwell 13d then is moving past ram 14, spindle 3 is standing still again, and tool 33 may again drill a radial hole in work 34. After the tool has been returned again, slope 13e moves past ram 14. Pawl-carrying disc 26 together with pawl 28 is returned to the initial position in which pawl arm 28a abuts against lug 32a and pawl 28 is disengaged from ratchet wheel 31. Cam 9 then leaves pin 7a and ceases to hold clutch member 6 in its neutral intermediate position. By the action of spring 11, therefore, spindle 3 is again coupled to pulley 4.

It is obvious to one skilled in the art, that a tool such as 33 may be mounted on a slide, together with the spindle 35 carrying same, the appurtenant bearing 36 and perhaps an appurtenant electric motor, in lieu of the conventional tools arranged fanlike in front of the headstock. A cam on the control shaft 5 could turn on and off said motor. Spindle 3 may be turned by an only slightly inclined face on cam disc 13 while tool 33 is working, for the purpose of effecting a curved groove in the work. When spindle 3 does not rotate, as is the case when one of the dwells 13b or 13d is moving past the ram, it may be longitudinally moved in known manner while tool 33 remains in the working position; in this way a longitudinal groove may be cut in the work.

It is obvious that the field of application of automatic lathes is very much enlarged with the aid of the arrangement of the present invention for driving the work spindle, many additional machining operations being made possible. It may be readily seen that not only the attainable accuracy is increased, because the workpieces do not have to be reclamped any longer, but also savings are made possible in working times and secondary times and in investment costs for other machine tools.

Various modifications may be made on the form of invention shown and described; for example the gearing unit 21 thru 25 could be replaced by a change gear assembly.

What I claim as new and desire to secure by Letters Patent, is:

1. An automatic lathe comprising a working-carrying spindle, first means rotatably mounting said spindle on said lathe, a continuously rotating control shaft, a motor unit to which said spindle is normally coupled to drive said spindle, second means actuable through said control shaft to uncouple said spindle from said motor unit and stop said spindle, cam means mounted on said control shaft, and a transmission actuable by said cam means to rotate said spindle at least one time through an angle of less than 360° after said spindle is uncoupled from said motor unit and stopped whereby rotation of said spindle after said spindle is stopped is subsequently continuously and solely controlled by said cam means acting through said transmission.

2. A lathe as set out in claim 1, in which said second means comprises a clutch brake including a member mounted on said spindle, which member is temporarily pressed against a stopped structural part for braking said spindle.

3. A lathe as set out in claim 1, in which said transmission comprises a pawl-carrying disc coaxial to said spindle and mounted loosely rotatable thereon, a spring-laded pawl pivoted to said disc, the latter under spring-action occupying as long as said transmission is not actuated by said cam means a position of rest in which the pawl abuts against a stationary stop and thus is disengaged from a ratchet fixed to said spindle and third means interconnecting said cam means and said pawl-carrying disc.

4. A lathe as set out in claim 3, wherein said third means comprises a longitudinally movable ram tracing said cam means, a rack movable in the same direction as said ram and spring-pressed against the ram end remote from said cam means, and a gear train for transmitting movement of said rack to said pawl-carrying disc.

5. An automatic lathe comprising a working-carrying spindle, first means rotatably mounting said spindle on said lathe, a continuously rotating control shaft, second means normally coupled to said spindle to drive said spindle, a first cam means operatively carried by said control shaft, means actuated by said first cam means to uncouple said second means from said spindle and stop said spindle, second cam means operatively carried by said control shaft and a transmission actuated by said second cam means to rotate said spindle selectively one or several times through an angle of 360° after said second means is uncoupled from said spindle and said spindle is stopped whereby rotation of said spindle by said transmission is continuously controlled by said second cam means.

6. A lathe as set out in claim 4, in which is provided a tool rotatable about an axis standing at right angle to the axis of said spindle, the longitudinal movements of said tool being controlled by the control shaft.

References Cited in the file of this patent

UNITED STATES PATENTS

| | | |
|---|---|---|
| 233,821 | Vinton | Oct. 26, 1880 |
| 330,174 | Vandergrift | Nov. 10, 1885 |
| 476,953 | Church | June 14, 1892 |
| 1,061,973 | Bilton | May 20, 1913 |

FOREIGN PATENTS

| | | |
|---|---|---|
| 633,668 | Germany | Aug. 3, 1936 |